US011679692B2

United States Patent
Bocchino et al.

(10) Patent No.: US 11,679,692 B2
(45) Date of Patent: Jun. 20, 2023

(54) SEATING SYSTEM FOR VEHICLES

(71) Applicant: ITALDESIGN-GIUGIARO S.P.A., Turin (IT)

(72) Inventors: Bartolomeo Bocchino, Turin (IT); Dario Caiero, Turin (IT); Alfredo Castiglione Morelli, Turin (IT); Gennaro Ferrara, Orbassano (IT)

(73) Assignee: ITALDESIGN-GIUGIARO S.P. A., Turin (IT)

( * ) Notice: Subject to any disclaimer, the term of this patent is extended or adjusted under 35 U.S.C. 154(b) by 546 days.

(21) Appl. No.: 16/603,551

(22) PCT Filed: Apr. 5, 2018

(86) PCT No.: PCT/EP2018/058697
§ 371 (c)(1),
(2) Date: Oct. 7, 2019

(87) PCT Pub. No.: WO2018/185207
PCT Pub. Date: Oct. 11, 2018

(65) Prior Publication Data
US 2020/0031251 A1 Jan. 30, 2020

(30) Foreign Application Priority Data
Apr. 6, 2017 (IT) ......................... 102017000038081

(51) Int. Cl.
*B60N 2/02* (2006.01)
*B60N 2/90* (2018.01)
(Continued)

(52) U.S. Cl.
CPC ............. B60N 2/0276 (2013.01); *B60N 2/14* (2013.01); *B60N 2/20* (2013.01); *B60N 2/99* (2018.02);
(Continued)

(58) Field of Classification Search
CPC ........ B60N 2/0276; B60N 2/304; B60N 2/99; B60N 2/995; B60N 2/14; B60N 2/20;
(Continued)

(56) References Cited

U.S. PATENT DOCUMENTS 7,866,696 B2 * 1/2011 Wang ................. B60N 2/42763
296/68.1
8,820,830 B2 * 9/2014 Lich ..................... B60N 2/4235
297/216.13
(Continued)

FOREIGN PATENT DOCUMENTS

DE   4226747 C1   12/1993
EP   3025921 A1   6/2016
(Continued)

OTHER PUBLICATIONS

International Search Report, issued in PCT/EP2018/058697, dated Jun. 8, 2018, Rijswijk, Netherlands.
(Continued)

*Primary Examiner* — Philip F Gabler
(74) *Attorney, Agent, or Firm* — Cittone Deniers & Arneri LLP; Henry J. Cittone

(57) ABSTRACT

A seating system is provided which comprises a seat movable between a standard seating position, in which the seat faces frontwards and the seat backrest is in an upright position for conventional driving mode, and at least one non-standard seating position in which the seat is rotated around a vertical axis with respect to the standard seating position and the backrest is reclined rearwards by rotation around a first transverse horizontal axis from the standard seating position. The seat is equipped with at least one passive safety device switchable between a working or active state, in which the device is able to protect an occupant of the seat in case of an impact of the vehicle, and a non-working or inactive state.

10 Claims, 3 Drawing Sheets

(51) Int. Cl.
  *B60N 2/14* (2006.01)
  *B60N 2/20* (2006.01)
  *B60R 21/207* (2006.01)
  *B60R 22/12* (2006.01)
  *B60R 21/00* (2006.01)
  *G05D 1/00* (2006.01)

(52) U.S. Cl.
  CPC ............ *B60N 2/995* (2018.02); *B60R 21/207* (2013.01); *B60R 22/12* (2013.01); *B60N 2002/0272* (2013.01); *B60R 2021/0044* (2013.01); *B60R 2021/0048* (2013.01); *G05D 1/0088* (2013.01)

(58) Field of Classification Search
  CPC .......... B60N 2002/0272; B60R 21/207; B60R 22/12; B60R 2021/0044; B60R 2021/0048; G05D 1/0088
  See application file for complete search history.

(56) References Cited

U.S. PATENT DOCUMENTS

| | | | |
|---|---|---|---|
| 9,827,876 B2* | 11/2017 | Madaras | B60R 21/04 |
| 9,981,622 B2* | 5/2018 | Ohmura | G01C 21/34 |
| 10,150,391 B2* | 12/2018 | Akaike | B60N 2/427 |
| 10,518,674 B1* | 12/2019 | Aikin | B60N 2/14 |
| 10,611,269 B1* | 4/2020 | Larner | B60N 2/0276 |
| 10,632,952 B2* | 4/2020 | Markusic | B60R 21/231 |
| 10,821,928 B2* | 11/2020 | Deng | B60R 21/23138 |
| 2019/0232822 A1* | 8/2019 | Hintermaier | B60N 2/0244 |

FOREIGN PATENT DOCUMENTS

| | | |
|---|---|---|
| EP | 3031724 A1 | 6/2016 |
| FR | 3039123 A1 | 1/2017 |

OTHER PUBLICATIONS

Written Opinion, issued in PCT/EP2018/058697, dated Jun. 8, 2018, Rijswijk, Netherlands.

* cited by examiner

SEATING SYSTEM FOR VEHICLES

CROSS-REFERENCE TO RELATED APPLICATIONS

This application is the U.S. National Stage of PCT International Patent Application No. PCT/EP2018/058697, filed Apr. 5, 2018, which claims priority to Italian Patent Application No. 102017000038081, filed Apr. 6, 2017, the disclosures of each of which are incorporated herein by reference in their entireties.

FIELD OF THE INVENTION

The present invention relates to a seating system for vehicles, particularly although not necessarily autonomous vehicles, comprising at least one seat for an occupant of the vehicle which is movable between a standard seating position, where the seat faces frontwards and the backrest of the seat is in the upright position for conventional driving mode, and at least one non-standard seating position, where the seat is rotated around the vertical axis by an angle comprised between 0 and 180 degrees with respect to the standard seating position or the backrest is reclined rearwards by rotation around a transverse horizontal axis from the standard seating position.

With such a seating system, therefore, the occupant may sit on board of the vehicle either in the standard seating position, which is the required position in case the occupant has to actively drive the vehicle, or in the non-standard seating position, which is allowed when the vehicle is running in autonomous driving mode. At least two non-standard seating positions are available, one of which (hereinafter referred to as "rotated non-standard seating position") is obtained by rotation of the whole seat around the vertical axis while the other one (hereinafter referred to as "reclined non-standard seating position") is obtained by rotation of the backrest around the transverse horizontal axis. There may of course be more than two non-standard seating positions, for example one reclined non-standard seating position and two rotated non-standard seating positions (rotated for example by 90 and 180 degrees, respectively, relative to the standard seating position).

BACKGROUND OF THE INVENTION

In the known seating systems the seat is provided with standard passive safety devices, such as for example three-point safety belts, which are able to adequately protect the occupant of the seat only when the seat is in the standard seating position.

SUMMARY OF THE INVENTION

It is an object of the present invention to provide a seating system of the above-identified type, which is able to effectively protect the occupant of the seat not only when the seat is in the standard seating position but also when the seat is in any one of the available non-standard seating positions.

This and other objects are fully achieved according to the present invention by a seating system as described and claimed herein.

Advantageous embodiments of the invention are also described.

In short, the invention is based on the idea of providing a seating system of the above-identified type, wherein the seat is equipped with at least one passive safety device arranged to protect the occupant of the seat when the seat is in the at least one non-standard seating position, wherein the at least one passive safety device is switchable between a working or active state, in which the device is able to protect the occupant of the seat in case of an impact of the vehicle, and a non-working or inactive state, and wherein the system further comprises sensors arranged to detect the current position of the seat, adjusting devices arranged to adjust the position of the seat between the standard seating position and the at least one non-standard seating position, activation devices arranged to cause switching of the at least one passive safety device between said working and non-working states, and an electronic control unit arranged to control the adjusting devices to adjust the position of the seat between the standard seating position and the at least one non-standard seating position and to control the activation devices, depending on the position of the seat detected by the sensors, so that when the seat is in the standard seating position the at least one passive safety device is in the non-working state, and when the seat is in the at least one non-standard seating position the at least one passive safety device is in the working state. In other words, when the seat moves from the standard seating position to any one of the available non-standard seating positions (which movement is carried out by the adjusting devices under control of the electronic control unit, when the occupant of the seat sends a suitable command to the electronic control unit, for example by pushing a control button mounted on the seat itself or on the vehicle dashboard) the at least one passive safety device is automatically switched to the working state by the activation devices under control of the electronic control unit.

With a seating system according to the invention, therefore, the occupant of the seat is protected in case of an impact of the vehicle not only when the seat is in the standard seating position, but also when the seat is in any one of the non-standard seating positions to which the seat can be moved starting from the standard seating position. A significant improvement in occupant safety in the event of an impact of the vehicle is thus obtained over the currently available seating systems.

Further features and advantages of the present invention will become apparent from the following detailed description, given purely by way of non-limiting examples with reference to the drawings.

DETAILED DESCRIPTION OF PREFERRED EMBODIMENTS

Figure 1:
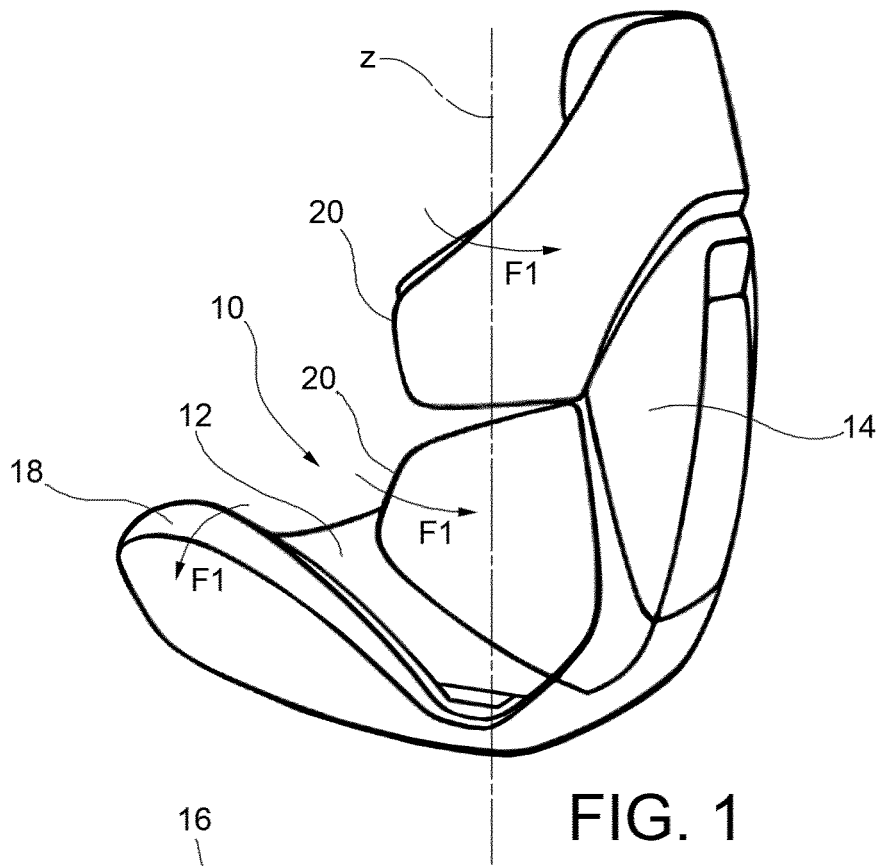
FIGS. 1 and 2 are perspective views that schematically show a vehicle seat forming part of a seating system according to the present invention, in the standard seating position and in a rotated non-standard seating position obtained by 180-degrees rotation of the whole seat around the vertical axis, respectively, wherein the seat is provided with a first passive safety device.
Figure 2:
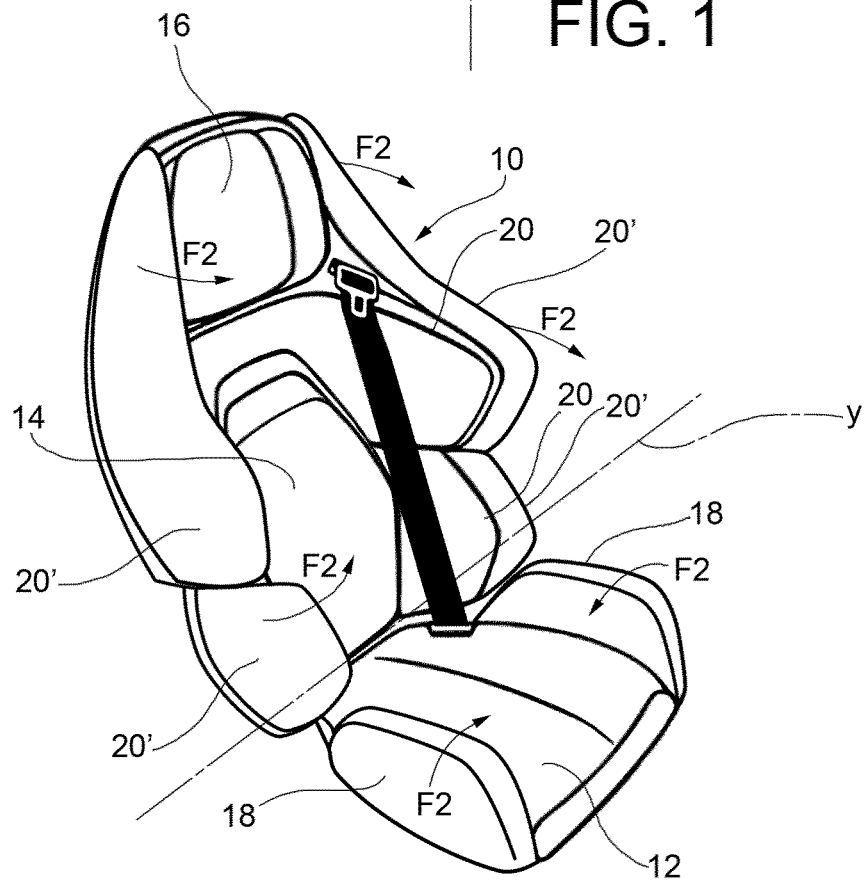

With reference first to FIGS. 1 and 2, a seating system for vehicles, particularly autonomous vehicles, according to an embodiment of the present invention comprises a seat 10 for an occupant of the vehicle, in particular for the driver.

The seat 10 basically comprises a seat base 12, a backrest 14 and a headrest 16.

The seat base 12 is rotatably mounted on the vehicle floor around a vertical axis (indicated with z), so that the whole seat 10 is able to rotate around the vertical axis z. The backrest 14 is rotatably connected on its bottom side to the seat base 12 for rotation around a transverse horizontal axis (indicated with y) that is fixed relative to the seat base 12. The headrest 16 is mounted on top of the backrest 14 and may be adjustable in height relative to the backrest 14.

The seat 10 may be positioned in a standard seating position (FIG. 1), where the seat 10 faces frontwards and the backrest 14 is in an upright position for conventional driving mode. With the seat 10 in this position, therefore, the occupant of the seat is able to drive the vehicle using the steering wheel, the pedals, the gearshift lever etc.

By rotation around the vertical axis z and/or around the horizontal axis y the seat 10 can be moved to at least one non-standard position when the vehicle is operating in autonomous drive mode. In FIG. 2, for example, the seat 10 is in a first rotated non-standard position where the seat is rotated by 180 degrees around the vertical axis z relative to the standard seating position, so that the occupant of the seat faces rearwards. A second rotated non-standard position (not shown) may be provided for, where the seat 10 is rotated by 90 degrees relative to the standard seating position, so that the occupant of the seat faces towards a side (either the left side or the right one) of the vehicle. Further rotated non-standard seating positions may be obtained by rotation of the whole seat 10 around the vertical axis z by an angle comprised between 0° and 180°.

Figure 4:
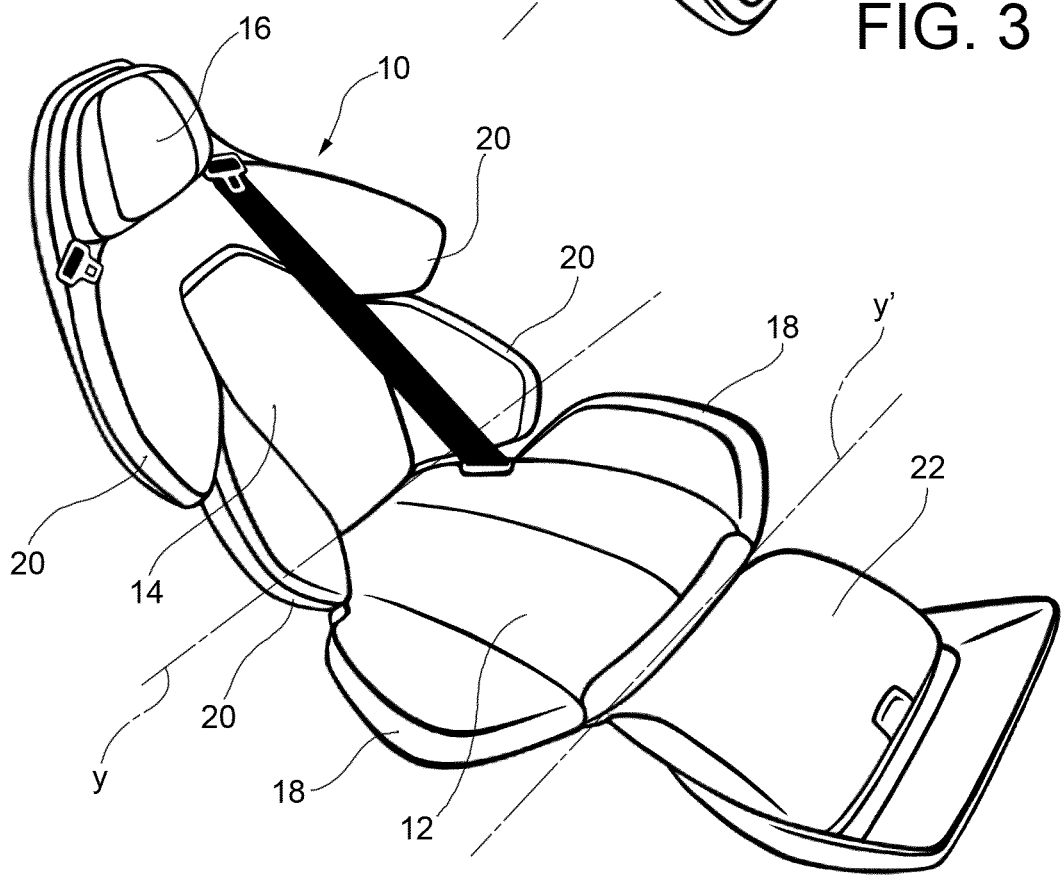

A further non-standard position of the seat 10 (reclined non-standard seating position) is shown in FIG. 4 and is obtained by rotation of the backrest 14 around the horizontal axis y, so that the backrest 14 is reclined rearwards.

Preferably, the two above-mentioned rotational movements, i.e. the rotational movement of to the whole seat 10 around the vertical axis z and the rotational movement of the backrest 14 around the horizontal axis y, are performed alternatively to each other. In other words, starting from the standard position either the seat 10 is rotated around the vertical axis z to reach the first or second rotated non-standard seating position defined above or the backrest 14 is rotated around the horizontal axis y to position the seat in the aforesaid reclined non-standard seating position. This ensures a quick return of the seat 10 to the standard seating position when the seat is in a non-standard seating position, as only one movement has to be carried out to position the seat back to the standard seating position.

Anyway, in an alternative embodiment the two rotational movements may be carried out simultaneously or one after the other to arrange to seat in a further non-standard seating position where the seat is rotated by a given angle (for example 90 or 180 degrees) around the vertical axis z relative to the standard seating position and the backrest is rotated by a given angle around the horizontal axis y relative to the standard seating position.

The above-mentioned rotational movements of the seat 10 are performed by adjusting devices (which are not shown in the drawings, but are of known type), such as for example electrically-operated adjusting devices, under control of an electronic control unit (not shown) governing the operation of the seating system. When the user selects one of the available non-standard positions, by pushing for example a corresponding control button on the seat or on the vehicle's dashboard, the electronic control unit drives the adjusting devices to rotate the seat 10 around the vertical axis z or to rotate the backrest 14 around the horizontal axis y starting from the standard seating position until the seat 10 reaches the desired non-standard seating position.

The seat 10 is provided with seat position sensors (which are not shown in the drawings, but are of known type) arranged to detect the position of the seat and to send corresponding position signals to the electronic control unit, so that at any time the electronic control unit is informed about the current position of the seat.

In order to adequately protect the occupant in case of an impact of the vehicle when the seat 10 is in any one of the non-standard seating positions illustrated above, the seat 10 is to provided with a first passive safety device and/or a second passive safety device and/or third passive safety device as explained below.

Each of these passive safety devices is switchable between a working or active state, in which the device protects the occupant of the seat in the event of an impact of the vehicle, and a non-working or inactive state, in which the device does not offer protection to the occupant of the seat in case of impact.

As will be explained in detail below, activation devices controlled by the electronic control unit are associated to each passive safety device to automatically switch the latter from the non-working state to the working state, and vice versa, when the seat is moved from the standard seating position to a non-standard seating position, and vice versa.

As is shown in FIGS. 1 and 2, the first passive safety device comprises at least one pair of first adjustable side rests 18 arranged on the two opposites sides (left side and right side) of the seat base 12 to provide lateral restraint for the occupant's legs in case of impact and at least one pair (two pairs, in the illustrated embodiment) of second adjustable side rests 20 arranged on the two opposites sides (left side and right side) of the backrest 14 to provide lateral restraint for the occupant's trunk in case of impact. Both the first side rests 18 and the second side rests 20 are movable between a non-working state (FIG. 1) and a working state (FIG. 2).

The first and second side rests 18 and 20 may be rotatably connected to the seat base 12 and to the backrest 14, respectively. In this case, in the non-working state of the first passive safety device the first and second side rests 18 and 20 are rotated outwards (as indicated by arrows F1 in FIG. 1), i.e. away from the occupant of the seat, while in the working state of the first passive safety device they are rotated inwards (as indicated by arrows F2 in FIG. 2), i.e. towards the occupant of the seat, so that the occupant is restrained both with his legs and with his trunk between the side rests 18 ad 20, respectively.

Additionally, cover panels 20' covering the outer surfaces of the second side rests 20 may each slide relative to the respective second side rest 20 between a retracted position (FIG. 1), when the first passive safety device is in the non-working state, and an extended position (FIG. 2), when the first passive safety device is in the working state. Cover panels (not shown) covering the outer surfaces of the first side rests 18 may also be each slidable relative to the respective first side rest 18 between a retracted position and an extended position, like the cover panels 20' associated to the second side rests 20. When the cover panels of the first and second side rests 18 and 20 are in the extended position, they form a sort of shell that laterally surrounds the occupant's body, in particular the legs and trunk of the same, thereby increasing the occupant's lateral restraint.

While an arrangement where the first and second side rests are rotatable inwards and outwards and the cover panels of the first and second side rests are slidable between a retracted position and an extended position is preferable, it may also be envisaged that the first and second side rests 18 and 20 are fixed and only their cover panels are slidably movable between the retracted position (non-working state) and the extended position (working state)

Movement of the first and second side rests 18 and 20 and/or of the respective cover panels between the non-working state and the working state is automatically carried out by first activation devices (not shown), such as for example electrically-operated mechanisms, under control of the electronic control unit, so that the first passive safety device is in the non-working state when the seat 10 is in the standard seating position and is switched to the working state when the seat 10 is rotated around the vertical axis z to reach either of the aforesaid first and second rotated non-standard seating positions.

Figure 3:
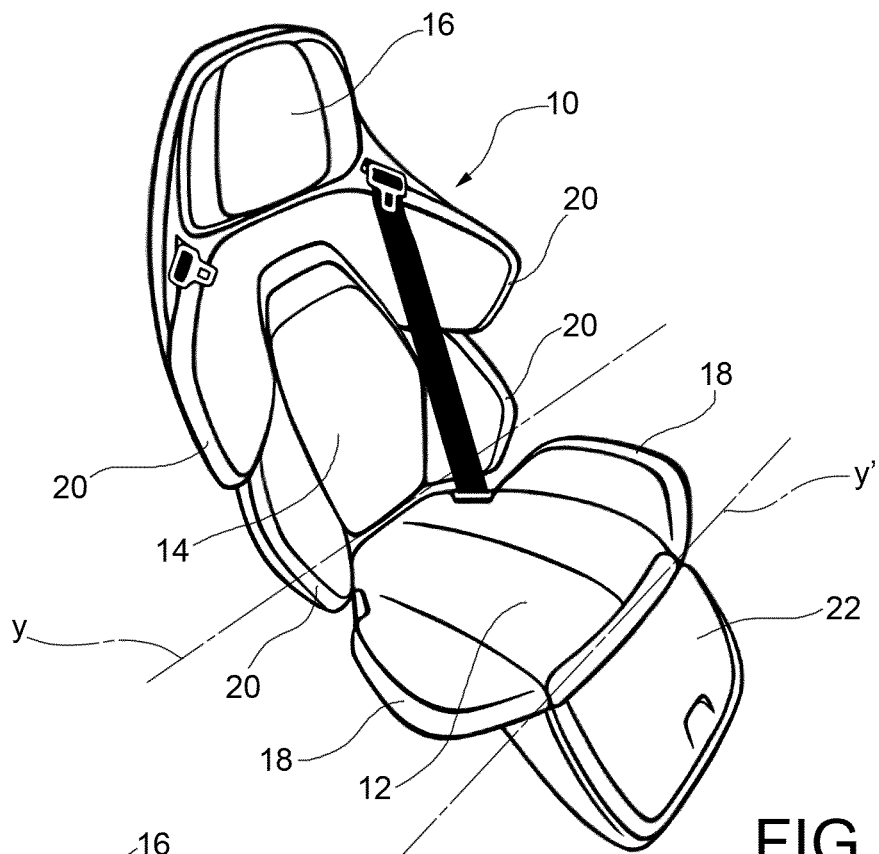
FIGS. 3 and 4 are perspective views that schematically show the vehicle seat of FIGS. 1 and 2, in the standard seating position and in a reclined non-standard seating position obtained by rearward rotation of the backrest around a transverse horizontal axis, respectively, wherein the seat is further provided with a second passive safety device and a third passive safety device.

With reference now to FIGS. 3 and 4, the second passive safety device comprises a footrest 22 that is rotatably connected to the seat base 12 around a transverse horizontal axis y' parallel to axis y. By rotation around the horizontal axis y' the footrest 22 is movable between a non-working state (FIG. 3), in which the footrest 22 is retracted and do not therefore provide any support surface for the occupant's feet, and a working state (FIG. 4), in which the footrest 22 projects frontwards from the seat base 12 and provides a support surface for the occupant's feet, thereby preventing, or at least limiting, the so-called submarining phenomenon.

Movement of the footrest 22 between the non-working state and the working state is automatically carried out by second activation devices (not shown), such as for example an electrically-operated mechanism, under control of the electronic control unit, so that the footrest 22 is in the non-working state when the seat 10 is in the standard seating position and is moved to the working state when the backrest 14 is rotated around the horizontal axis y, i.e. when the seat 10 is in the reclined non-standard seating position.

Figure 5:
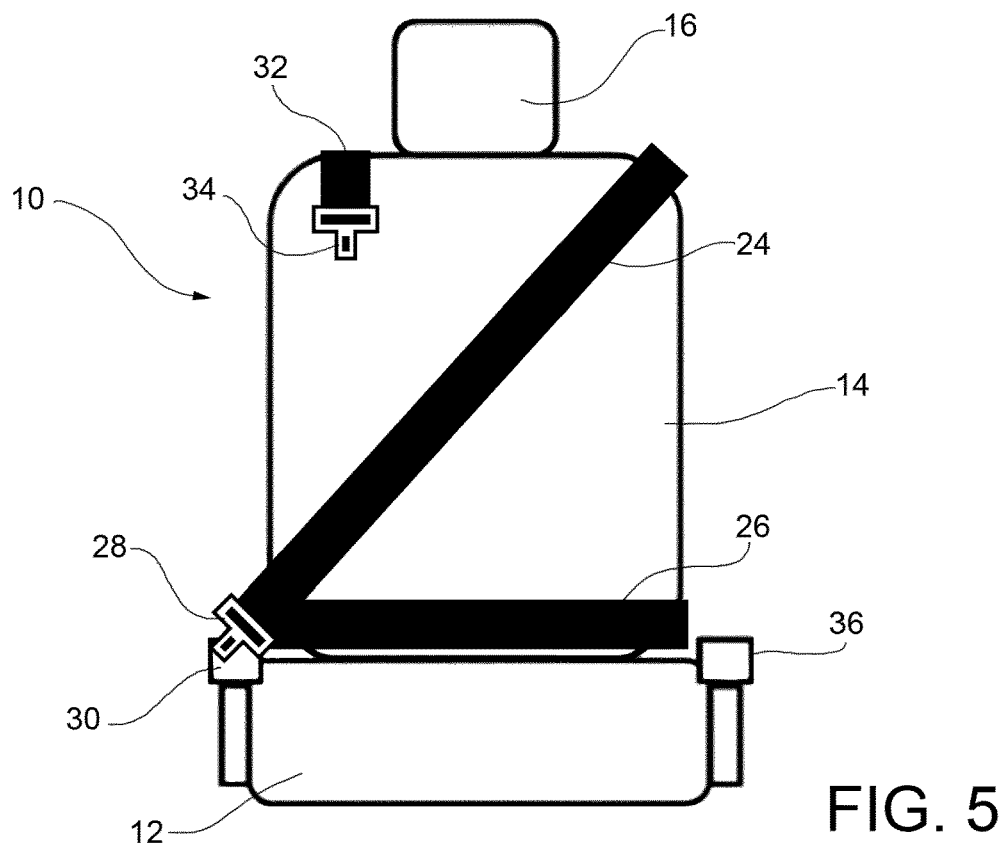
FIGS. 5 and 6 are front views that schematically show a seat of a seating system according to the present invention, with the third passive safety device in the non-working state and in the working state, respectively.
Figure 6:
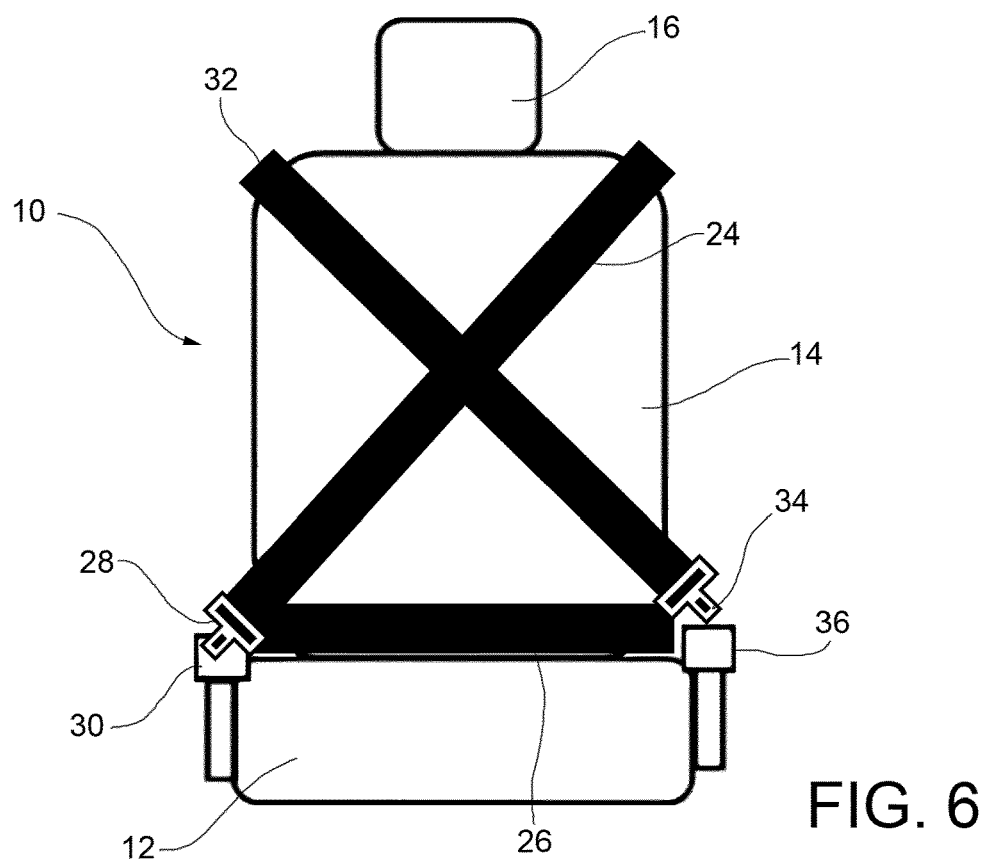

FIGS. 5 and 6 of the drawings show the third passive safety device in the non-working state and in the working state, respectively. The third passive safety device comprises an auxiliary seat belt restraint system in addition to a main seat belt restraint system that is made as a conventional three-point seat belt restraint system and includes a first diagonal belt strap 24, a horizontal belt strap 26, a first tongue-like element 28 which is connected to the free ends of the first diagonal belt strap 24 and of the horizontal belt strap 26 and a first buckle 30 to which the first tongue-like element 28 can be releasably coupled.

The auxiliary seat belt restraint system comprises a second diagonal belt strap 32, a second tongue-like element 34 connected to a free end of the second diagonal belt strap 32 and a second buckle 36 to which the second tongue-like element 34 can be releasably coupled. As can be seen in FIG. 6, once the main seat belt restraint system is fastened, the auxiliary seat belt restraint system can also be fastened by coupling the second tongue-like element 34 to the second buckle 36 and, in this condition, the second diagonal belt strap 32 extends over the occupant's trunk crossing the first diagonal belt strap 24, thus increasing occupant restraint, in particular lateral occupant restraint, in case of impact of the vehicle.

The auxiliary seat belt restraint system is to be fastened when the seat 10 is in any one of the above-mentioned non-standard seating positions. Fastening of the auxiliary seat belt restraint system is not carried out in automated manner, but has to be done by the occupant himself. However, in order to prompt the occupant to fasten the auxiliary seat belt restraint system when the seat 10 is in a non-standard seating position, a seat belt reminder (not shown, but of known type) is associated to the auxiliary seat belt restraint system and is configured to produce a warning signal, such as for example an acoustic signal, when the seat 10 is in a non-standard seating position, until the auxiliary seat belt restraint system is fastened. Operation of the seat belt reminder is controlled by the electronic control unit depending on the position signals provided by the seat position sensors. Naturally, instead of merely producing a warning signal by the seat belt reminder, the electronic control unit may be arranged for example to prevent driving of the vehicle, when the seat 10 is in a non-standard seating position, until the auxiliary seat belt restraint system is fastened. The seat belt reminder acts therefore as an activation device associated to the third passive safety device, causing the third passive safety device to switch from a non-working state (corresponding to the state where the auxiliary seat belt restraint system is not fastened) to a working state (corresponding to the state where the auxiliary seat belt restraint system is properly fastened).

As already explained, the seat 10 is preferably equipped with all the three passive safety devices described above, but may also comprise only one or two of them.

Finally, the seat 10 is also preferably provided with integrated airbags (not shown), in particular airbags for the occupant's head and airbags for the occupant's thorax which are selectively activated depending on the position of the seat. When the seat 10 is in the standard seating position all the above-mentioned airbags are activated and therefore, in case of impact they may be all inflated to protect the occupant. On the other hand, when the seat 10 is in any of the non-standard seating positions only the head airbags are activated and may be inflated in case of impact to protect the occupant's head.

The principle of the invention remaining unchanged, embodiments and constructional details may be modified with respect to those described herein purely by way of non-limiting examples, without thereby departing from the scope of protection as described and claimed herein.

The invention claimed is:

1. A seating system for vehicles comprising a seat with a seat base rotatable about a vertical axis and a backrest rotatably connected to the seat base for rotation about a first transverse horizontal axis, whereby the seat is movable between a standard seating position, in which the seat faces frontwards and the backrest is in an upright position for conventional driving mode, and at least one non-standard seating position in which the seat is rotated around the vertical axis with respect to the standard seating position and the backrest is reclined by rotation around said first transverse horizontal axis from the standard seating position, wherein the seat is equipped with at least one passive safety device which is switchable between a working state, in which said at least one passive safety is able to protect an occupant of the seat in case of impact of the vehicle, and a non-working state, and wherein the system further comprises position sensors arranged to detect position of the seat, adjusting devices arranged to adjust the position of the seat between said standard seating position and said at least one non-standard seating position, activation devices arranged to cause switching of said at least one passive safety device between said working state and said non-working state, and an electronic control unit arranged to control the adjusting devices to adjust the position of the seat between said standard seating position and said at least one non-standard seating position and to control said activation devices, depending on the position of the seat detected by said position sensors, so that when the seat is in said standard seating position said at least one passive safety device is in the non-working state and when the seat is in said at least one non-standard seating position said at least one passive safety device is in the working state.

2. The seating system of claim 1, wherein said at least one passive safety device comprises at least one pair of first adjustable side rests mounted on the seat base, said first adjustable side rests being arranged to provide, when in the working state, lateral restraint for the occupant's legs in case of impact.

3. The seating system of claim 2, wherein said first adjustable side rests are rotatable relative to the seat base between the working state and the non-working state.

4. The seating system of claim 2, wherein said first adjustable side rests are slidable relative to the seat base between the working state and the non-working state.

5. The seating system of claim 2, wherein said at least one passive safety device comprises at least one pair of second adjustable side rests mounted on the backrest, said second adjustable side rests being arranged to provide, when in the working state, lateral restraint for the occupant's trunk in case of impact.

6. The seating system of claim 5, wherein said second adjustable side rests are rotatable relative to the backrest between the working state and the non-working state.

7. The seating system of claim 5, wherein said second adjustable side rests are slidable relative to the backrest between the working state and the non-working state.

8. The seating system of claim 1, wherein said at least one passive safety device comprises a footrest rotatably connected to the seat base around a second transverse horizontal axis parallel to said first transverse horizontal axis, said footrest projecting frontwards from the seat base, when in the working state, to provide a support surface for the occupant's feet.

9. The seating system of claim 1, wherein the seat is equipped with a main seat belt restraint system having a first diagonal belt strap and a horizontal belt strap and wherein said at least one passive safety device comprises an auxiliary seat belt restraint system having a second diagonal belt strap that, in the working state, extends over the occupant's trunk crossing the first diagonal belt strap.

10. The seating system of claim 1, wherein the seat is equipped with integrated airbags for the occupant's head and thorax, said integrated airbags being arranged to be selectively activated depending on the position of the seat as detected by said position sensors.

* * * * *